United States Patent
Sambrook

(10) Patent No.: US 7,290,586 B2
(45) Date of Patent: Nov. 6, 2007

(54) BICONTINUOUS COMPOSITES

(75) Inventor: Rodney Martin Sambrook, Sheffield (GB)

(73) Assignee: Dytech Corporation Limited (GB)

( * ) Notice: Subject to any disclaimer, the term of this patent is extended or adjusted under 35 U.S.C. 154(b) by 0 days.

(21) Appl. No.: 10/362,319

(22) PCT Filed: Aug. 22, 2001

(86) PCT No.: PCT/GB01/03764

§ 371 (c)(1),
(2), (4) Date: Jun. 2, 2003

(87) PCT Pub. No.: WO02/16286

PCT Pub. Date: Feb. 28, 2002

(65) Prior Publication Data

US 2004/0094284 A1    May 20, 2004

(30) Foreign Application Priority Data

Aug. 22, 2000 (GB) ................... 0020734.0

(51) Int. Cl.
  *B22D 19/00* (2006.01)
  *C04B 38/00* (2006.01)
(52) U.S. Cl. ................. 164/98; 264/44; 264/610
(58) Field of Classification Search ......... 164/97, 164/98; 264/42, 43, 44, 610, 682
See application file for complete search history.

(56) References Cited

U.S. PATENT DOCUMENTS

| 3,568,723 A | * | 3/1971 | Sowards ............ 138/143 |
| 4,004,933 A | * | 1/1977 | Ravault ............. 501/81 |
| 4,822,694 A | | 4/1989 | Randin et al. |
| 4,909,300 A | * | 3/1990 | Horie ............. 164/69.1 |
| 5,167,271 A | * | 12/1992 | Lange et al. ........ 164/103 |
| 5,308,669 A | * | 5/1994 | Prucher ............. 428/72 |
| 5,571,848 A | * | 11/1996 | Mortensen et al. ...... 521/61 |
| 5,588,477 A | | 12/1996 | Sokol et al. |
| 5,664,616 A | * | 9/1997 | Gegel ............... 164/97 |
| 6,660,224 B2 | * | 12/2003 | Lefebvre et al. ........ 419/2 |

FOREIGN PATENT DOCUMENTS

| DE | 3924267 | | 12/1994 |
| EP | 0815989 | | 1/1998 |
| GB | 2 317 887 A | * | 4/1998 |
| JP | 61163224 | | 7/1986 |
| WO | WO93/04013 A1 | * | 3/1993 |
| WO | WO 93/04013 A1 | * | 3/1993 |

OTHER PUBLICATIONS

PCT International Search Report based on Application No. PCT/GB 01/03764.

* cited by examiner

*Primary Examiner*—Kevin P. Kerns
(74) *Attorney, Agent, or Firm*—Caesar, Rivise, Bernstein, Cohen & Pokotilow, Ltd.

(57) ABSTRACT

A ceramic foam having pores in the range of 20 to 800 microns and 10 to 30 % of theoretical density is placed in a preheated mould and molten metal or plastics is drawn in to form a bicomposite structure.

7 Claims, 1 Drawing Sheet

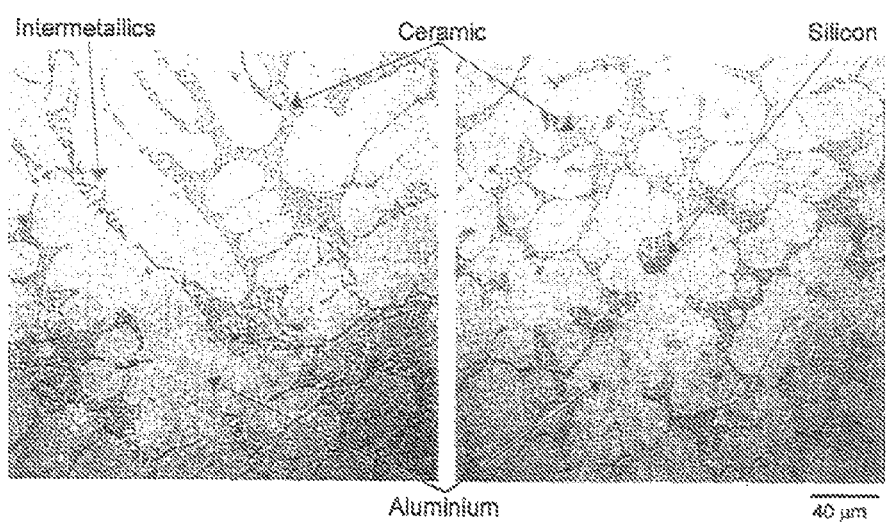

BICONTINUOUS COMPOSITES

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Field of the Invention

The invention relates to bicontinuous composites and more particularly to bodies comprising two interconnected three dimensional networks. In one particular aspect of the invention one network is a ceramic foam and the other solidified material typically metal or plastics.

According to the invention in one aspect there is provided a method of forming a body comprising two interconnected three dimensional networks, the method comprising locating in a mold a preformed porous ceramic network comprising an inter-connected skeleton having a density less than about 60% theoretical density and having pores the majority of which range from about 20 to about 2000 micron, drawing molten metal or polymeric material into the pores of the preformed porous ceramic network and allowing the metal or polymeric material to solidify therein.

Preferably the method includes the step of allowing the metal to solidify in the pores at a low cooling rate to put the two networks in intimate contact. Preferably the molten metal or polymeric material is drawn into the preformed porous until the ceramic skeleton is filled completely.

Preferably the molten metal or polymeric material is drawn into the preformed porous ceramic by vacuum and/or pressure or the casting may be done using a pressureless metal infiltration technique. The method may be performed by squeeze casting.

In a preferred step the mould is preheated.

BRIEF SUMMARY OF THE INVENTION

Preferably the preformed porous ceramic phase has a controlled degree of reticulation. The reticulation should be high to reduce the pressure gradient generated in metal infiltration and to minimise the level of defects associated with differential thermal contraction on cooling. Such defects can be shrinkage and interfacial debonding.

The method may include the subsequent step of removing all or part of the solidified metal or plastics.

Solidification of the polymeric material or resin may involve an exothermic reaction. Subsequent cooling is controlled to reduce the potential for bond defects. Monomers may be polymerised in situ. Cross linking agents may be used in modifying the properties of the polymeric material to optimise the properties of the composites.

In another aspect the invention provides a body comprising a preformed porous ceramic network having pores the majority of which range from about 20 to about 2000 micron, and a theoretical density less than about 60% of theoretical density the pores being filled with solidified metal or plastics.

The foam ceramic has a substantially totally interconnected porosity at densities less than 60%, preferably less than 30%, of theoretical density. The density may range from about 10% to about 30%. Typical average pore sizes are in the range 60-1400, preferably 60-650 micron.

The density of the foam ceramic is preferably below 30% to ensure substantially totally interconnected porosity. Higher densities may be useful in circumstances in which a denser material is required for reasons of strength or permeability.

These denser materials, i.e. density higher than 30% of theoretical density but in the case of the foaming technique based on agitation limited to a maximum of 60% may be applied to the less dense materials in the green or fired state to create porosity gradients across the porous article. Before use, the article will need to be fired. The thickness of these layers may be varied to suit the application.

Higher density layers up to fully dense may be applied to the foam ceramic in the green state by processing techniques such as gel casting, coagulation casting. The article formed will need to be fired before use.

The proportions of the two phases may readily be adjusted so that the foam ceramic makes up the major component by volume of the formed body or the metal phase does so.

The totally interconnected pore structure allows deep penetration of the pores of the foam ceramic. The penetrating material may form a separate continuous matrix or it may be simply deposited on the interior walls.

The ceramic foam may be made from particles such as oxides and non-oxides. These materials are inherently stable to water or have a surface coating which is stable to the process conditions. Materials which have been used include alumina, zircon, spinel, silicon carbide, tin oxide, NZP, hydroxyapatite, zirconia, kyanite, cordierite and the like.

BRIEF DESCRIPTION OF THE SEVERAL VIEWS OF THE DRAWING

FIGS. 1 and 2 show two exemplary microstructures in accordance with the subject invention.

DETAILED DESCRIPTION OF THE INVENTION

It is much preferred of the invention that the skeleton is made by a method according to our earlier patents.

In particular, in our patent EP0598783B we have described and claimed: "a method of making a porous refractory article composed of refractory particles, the method comprising the steps of:
  a) forming a dispersion comprising particles in a liquid carrier;
  b) introducing gas into the dispersion;
  c) removing the liquid carrier to provide a solid article having pores derived from the bubbles;
  d) drying; and
  e) firing characterised in that the dispersion contains a polymerisable monomeric material."

In our patent application WO98/15505 we have described and claimed: "a method of melting a porous article composed of bonded particles (such as hydroxyapatite or the like) the method comprising the steps of:

a) forming a dispersion comprising a liquid carrier and the particles and a polymerisable monomeric material;
b) forming a foam of the dispersion;
c) polynmerising the foamed structure;
d) drying the structure to remove the liquid carrier and provide a solid article having pores derived from the bubbles, and
e) firing the article to remove the organic binder and provide a ceramic bond characterised in that small bubbles of gas are introduced in the dispersion with agitation to form the foam and are allowed to cause to coalesce before the polymerisation of the monomeric material.

In our patent application GB 0009731.1 we have described and claimed a method of making a ceramic foam by extrusion under low pressure. The foam ceramics made by that method are useful in the present invention.

It is intended that the entire disclosures of these earlier applications be incorporated herein merely by these references.

The surface properties of the walls of the pores of the ceramic may be modified to enhance the infiltration of the polymeric material or resin and/or control the bonding of the polymeric material or resin with the ceramic. Some of the agents may also modify the surface properties of the walls. This can be done by:

i) impregnating the surface with solutions containing metallo organic or inorganic salts. Various techniques of impregnation may be used such as incipient wetness, simple impregnation, vacuum impregnation, impregnation/deposition, etc. to establish the required surface concentration of the inorganic/metallo-organic salts. Promoters may be present, i.e. a material or treatment that promotes hardening of a hydrated precursor to enhance the calcium phosphate conversation. The surface concentration of calcium ions in a porous hydroxyapatite article may be enhanced by impregnation of the porous article with a solution containing calcium ions, drying and heating to an elevated temperature if required or by incorporating a calcium salt within the original composition of the porous article. Such a modification allows the enhanced adsorption of materials such as phosphonic acid esters. This can be done to the preformed carrier as an after treatment or to the particles still to be bonded together into the shape of an article, or
ii) by firing the carrier to a temperature below that required for full sintering of the ceramic. This value will depend on the nature of the material of which the carrier is made.
iii) by treating the surface with an acid or alkali, e.g. nitric acid, phosphoric acid, caustic, selected according to the material of the carrier.

The use of a degradable intermediate carrier is attractive because it is so versatile thus the deposit may be layered in different ways, e.g:

alternating layers of agent-free resin or polymer and of agent containing layers;
varying the concentration of agent across different layers of resin or polymer.

The metal phase may be provided by any suitable metal or alloy. Examples include aluminium, aluminium alloys, ferrous alloys, copper alloy, magnesium alloy, and the like. Preferably the metal or alloy is selected to have a melting temperature which will allow infiltration. Also, the metal or alloy should be compatible with the material of which the ceramic is made. The metal phase may be in one or two layers. The polymer or resin may be biodegradable.

The polymer or resin phase may be provided by any suitable polymer or resin. Examples include polyethylenes, acrylates, methacrylates, polyesters, polyanhydrides, and the like. The viscosity of the polymer or resin is selected to allow facile penetration of the preformed ceramic. Also, the polymer or resin should be compatible with the material of which the ceramic is made. The polymer or resin phase may be in one or two multi layers.

In the case of the plastics material the infiltration depth depends on the gel-time of the resin. The infiltration depth also depends on the sealing of the outside of the body to be filled. The infiltration depth depends on the viscosity of the resin used for infiltration. The viscosity may be adjusted where necessary using additives.

The totally interconnected pore structure allows the penetration of the pores of the foam ceramic such that the penetrating material forms a separate continuous matrix. The overall structure, i.e. the foam ceramic and the material in the pores, can be classified as bicontinuous matrices. This allows the combination of the properties of the foam ceramic and the penetrating material to be additive when, for instance, used as a composite. Alternatively the foam ceramic is used as a temporary carrier for the penetrating material which may be removed by heating, leaching, washing at the appropriate time to suit a particular application.

In a variation, metal is cast about and in a foam ceramic, following which the ceramic skeleton is removed by acid or caustic treatment or leaching. A preformed porous ceramic foam of this invention is particularly useful in this context. A turbine blade is an example of an article which may be made by this method.

In a preferred aspect of the invention the foam ceramic is infiltrated with molten metal or metal alloys to form bicontinuous metal matrix composites. Vacuum and/or pressure may be used. The choice of metal or metal alloy and ceramic can be optimised to suit a specific application. For instance, a preformed porous ceramic comprising foam alumina can be infiltrated by aluminium alloy by techniques such as squeeze casting and other techniques known to those skilled in the art, to give a bicontinuous aluminium metal matrix composite. The bicontinuous MMC has many advantages over MMCs with random distribution of the ceramic reinforcing phase such as increased wear resistance, increased stiffness, enhanced thermal and electrical conductivity and good damage tolerance. The article is of low density, say about 2.8 to about 3 $g.cm^3$.

A body of the invention may be used in different applications. One particular example is as disc brakes. The working environment of braking discs in transport applications requires the materials to have high stiffness, good wear resistance, high thermal conductivity, good damage tolerance and low density. The combination of physical and mechanical properties of bicontinuous Al-MMCs satisfies those requirements very well.

The additional advantages of bicontinuous Al-MMCs as materials for brake disc applications compared with currently used cast iron discs are:

much less prone to squealing;
much less prone to thermal cracking;
possibilities of local reinforcement.

The porous ceramic can be shaped such that inserts of dense ceramic such as alumina or perhaps metals can be put into place where perhaps a higher mechanical strength is required from the implant in ultimately load bearing situations. The ceramic or metal insert may be exposed at one or more of the foam ceramic external surfaces or be enclosed within a shell of foam ceramic. The thickness of this shell may typically be from 1 mm to 10 mm but is not limited to this range. Alternatively, the foam ceramic may be the insert contained within a dense ceramic or metal.

The method may be used to form articles useful in the automotive industry, e.g. crankshafts, water jackets, inlet manifolds, carburetor parts, convertible hard tops, roofs; aerospace components such as propeller blades; sports frames, etc. for cycles, rackets, boats; building components such as bricks, wall plates, ceiling tiles.

The following list gives some examples in different fields of industry.

Building Industry:
   sandwich elements for fire doors
   cladding panels for houses
   decking for oilrigs
   fire protection tiles Automotive and Transport Industry:
   body panels
   seat shells
   heat shields
   pump housings for oil pumps
   interior panels and doors
   aircraft trim panels
   graphitized as carbon/carbon brakes for aircraft
   automotive drive shafts, transmission housings, piston cylinder rings; rail brake systems; turbine blades and vanes; cycle frames.

Other:
   in communications—satellite housings,
   in sports equipment—golf club shafts, tennis racquet shafts.
   in electrical equipment—turntables.
   tank lining
   military components
   overwinding of epoxy pressure-pipes for fire protection
   Bioceramics—replacement joints The material may instead be selected from a wide variety of materials, such as general chemicals, petroleum derivatives, explosives, etc. The foam ceramic network holds these materials in a rigid matrix and so protects them from mechanical stress or the like. The penetrating material may also be a resin. For example, the foam ceramic matrix may be impregnated with resins, polymers or lubricants in intimate contact with the ceramic matrix. The choice of penetrating material and ceramic can be optimised to suit the final application in a wide range of industries whether in lightweight structures, abrasive shapes, self-lubricating ceramic bearings.

In order that the invention may be well understood it will now be described by way of illustration only with reference to the following examples.

EXAMPLE I

A slurry was mixed comprising 150 g alumina powder, 42 g of a 30 wt % solution of ammonium acrylate w/w also containing 1.25 wt % methylene bis acrylamide and 2 g water. To this was added 6 g Versicol KA11 and further mixed well for 5 minutes. 2 g of Dispex A40 was added and this was mixed further to form a low viscosity slip.

This was placed in a glove box and 10 drops of Tergitol TMN10 surfactant was added. This was foamed using mechanical frothing to a set volume for the density required.

Equal amounts of a 33% ammonium persulfate solution w/w and tetramethylethylene diamine were added. These were varied between 50 µl and 30 µl according to the gelation time required which in turn affects the final pore size. The longer the gelation time the larger the pores.

Samples were removed from the beakers and left to dry in air for 48 hours after which they were dried in a domestic microwave on low power.

The samples were fired at 1550° C. for 2 hours.

Three samples were made to have a nominal relative density of 10% of theoretical, 20% of theoretical and 25% of theoretical.

EXAMPLE II

Two samples of cordierite ceramic foam with different pore sizes were infiltrated with an aluminium alloy, namely LM6, the composition of which is given in Table 1. As the density of the foams was not measured before infiltration, the samples will be referred to as 1 and 2, 1 being more a porous structure than 2. Each has a theoretical density of about 20%. Infiltration was carried out by placing the ceramic preform in a mould with four heaters surrounding the length of the mould to ensure the metal remained liquid until the filling was complete. At the time these samples were made the fourth heater (that furthest from the fill end) was not working.

TABLE 1

| Composition of LM6 (maximum Wt. %) | | | | | | | | | | |
|---|---|---|---|---|---|---|---|---|---|---|
| Al | Si | Cu | Ni | Fe | Mg | Mn | Ti | Zn | Pb | Sn |
| Bal. | 13 | 0.1 | 0.1 | 0.6 | 0.1 | 0.5 | 0.2 | 0.1 | 0.1 | 0.05 |

The samples were first cut in half to see how far the aluminium had penetrated through the foam and the quality of the fill. The cross sections were ground and polished to 1 µm diamond for macroscopic analysis, and cubes of about 1 cm$^2$ were cut, mounted in conducting Bakelite, ground to 1200 grit and polished to 1 µm diamond for examination by optical and scanning electron microscopy. The optical microscopy was carried out on an MEF3 microscope using both macro and bright field techniques, and a Cambridge Instruments Stereoscan 360 with EDX was used for examination by SEM. Through these analysis techniques the quality of the microstructure could be determined, in particular signs of non-wetting of the ceramic by the metal, the quality of the interface between metal and ceramic, and porosity after were looked at. Finally, small cubes were cut from the sample, and through measurement of both dimension and weight the densities of the infiltrated foams were calculated.

The microstructure is shown in FIGS. 1 and 2. (500 magnification).

It will be seen that the Al foam fills and solidifies within the ceramic foam. The aluminium has completely surrounded the foam, which is observed as the grey granular structure. At the interfaces between the aluminium and ceramic there are also several small, different coloured particles. These were characterised in the SEM and found to be silicon, α(AlFeMnSi), or β(AlFeSi) phases (compositions in Table 2), although other phases may also be present in quantities too small to analyse in these samples. If we consider that the aluminium alloy probably solidifies by a process of constitutional supercooling, then it is expected that these intermetallic phases are the last to form when sufficient amounts of the minor elements have been rejected from the aluminium melt and concentrated at the edges form precipitates.

TABLE 2

| | Average composition of phases (Wt. %) | | | | | | | |
|---|---|---|---|---|---|---|---|---|
| Phase | Al | Si | Cu | Ni | Fe | Mg | Mn | Ti | Other |
| Silicon | 0.5 | 98 | 0.5 | 0.5 | 0.5 | | | | |
| (AlFeMnSi) | 59 | 9.8 | 1.5 | 1.75 | 20 | | 6.9 | | |
| (AlFeSi) | 53 | 15 | | 1.5 | 27 | | 2.5 | | |

Small pieces from the infiltrated region were cut to measure the relative densities. The small cubes were measured in dimension (volume) by a micrometer and by weight on scales. The following calculations were then made;

$$\frac{\text{mass (g)}}{\text{volume (cm}^3)} = \text{density (g/cm}^3)$$

For material 1;

$$\text{Density} = \frac{0.513}{5.245 \times 6.420 \times 5.945 \times 10^{-3}} = 2.56 \text{ g/cm}^3$$

For material 2;

$$\text{Density} = \frac{0.891}{8.920 \times 6.420 \times 5.860 \times 10^{-3}} = 2.66 \text{ g/cm}^3$$

These results show a small difference in the densities of the two samples. The density of LM6 is approximately 2.65 g/cm$^3$ and Cordierite is 2.5 g/cm$^3$.

The invention claimed is:

1. A method of forming a body comprising two interconnected three dimensional networks, the method comprising forming a porous ceramic network comprising an interconnected skeleton by: forming a dispersion comprising ceramic particles in liquid carrier and a polymerizable monomeric material; introducing gas into the dispersion; removing the liquid carrier to provide a solid article having pores derived from the gas; drying the solid article; and firing the solid article to provide the porous ceramic network; the porous ceramic network having a density less than about 30% theoretical density, the majority of the pores having a range from about 20 to about 2000 microns; locating the porous ceramic network in a mould, drawing molten metal or polymeric material into the pores of the preformed porous ceramic network and allowing the metal or polymeric material to solidify therein.

2. A method according to claim 1, wherein the molten metal or polymeric material is drawn into the preformed porous ceramic network by vacuum and/or pressure.

3. A method according to claim 1, wherein the mould is preheated.

4. A method according to claim 1, wherein the molten metal or polymeric material is drawn into the pores of the porous ceramic network using a pressureless process.

5. A method according to claim 1, comprising performing the method by squeeze casting.

6. A method according to claim 1, wherein the preformed porous ceramic network has a density of 10 to 30% of theoretical and average pore size of 60 to 1400 microns.

7. A method according to claim 1, including the subsequent step of removing all or part of the solidified metal or polymeric material.

\* \* \* \* \*